US009214843B2

(12) United States Patent
Jung

(10) Patent No.: US 9,214,843 B2
(45) Date of Patent: Dec. 15, 2015

(54) METHOD OF BINDING STATOR COILS OF MOTOR

(71) Applicant: HYUNDAI MOBIS CO., LTD., Seoul (KR)

(72) Inventor: Daesung Jung, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 395 days.

(21) Appl. No.: 13/654,352

(22) Filed: Oct. 17, 2012

(65) Prior Publication Data

US 2013/0300232 A1 Nov. 14, 2013

(30) Foreign Application Priority Data

May 14, 2012 (KR) .................. 10-2012-0050649

(51) Int. Cl.
*H02K 15/00* (2006.01)
(52) U.S. Cl.
CPC ....... *H02K 15/0087* (2013.01); *Y10T 29/49009* (2013.01)
(58) Field of Classification Search
CPC ...... H02K 3/12; H02K 3/28; Y10T 29/49009; Y10T 29/53143; Y10T 29/49071; Y10T 29/49073; Y10T 29/49012

USPC ........... 310/179, 180, 201, 208, 71, 260, 414; 29/596, 235, 598, 605, 606
See application file for complete search history.

(56) References Cited

U.S. PATENT DOCUMENTS 6,462,453 B1 * 10/2002 Asao et al. .................. 310/179

FOREIGN PATENT DOCUMENTS

JP 2004-187437 A 7/2004
JP 2008-131672 A 6/2008

* cited by examiner

*Primary Examiner* — Thiem Phan
(74) *Attorney, Agent, or Firm* — Knobbe Martens Olson & Bear LLP

(57) ABSTRACT

A method of making an electric motor includes installing a plurality of hairpin coils in a plurality of slots, wherein the plurality of hairpin coils comprise a first hairpin coil and a second hairpin coil, the first hairpin coil comprising a first end and the second hairpin coil comprising a second end. The method further includes inserting the first and second ends into a void of an electrically conductive coupler to electrically connect the first and second ends; and placing the insulation cap over the coupler so as to protect the coupler from contacting other electric conductive materials.

10 Claims, 6 Drawing Sheets

FIG.3
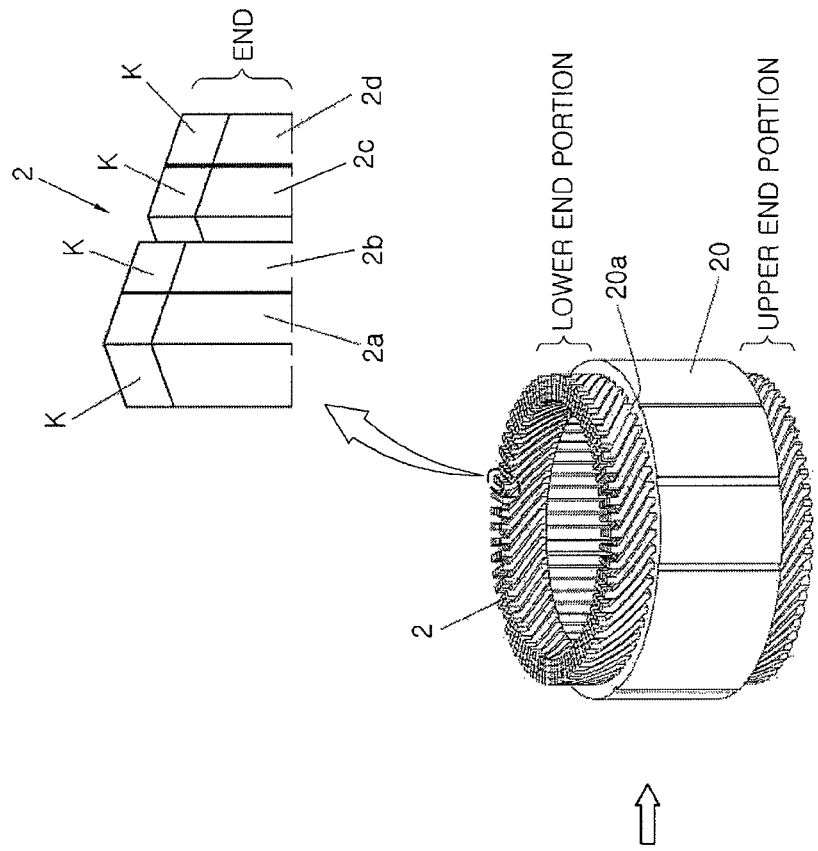
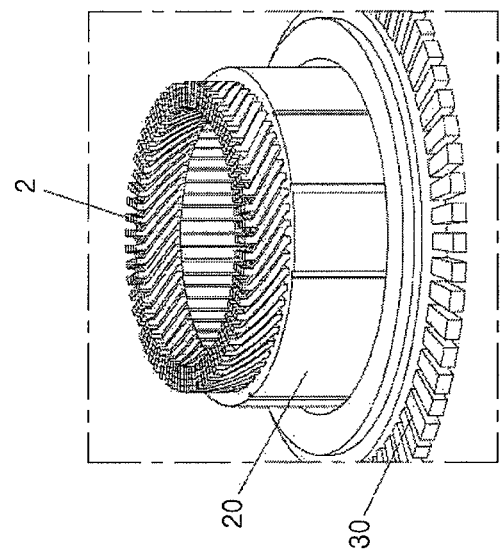

METHOD OF BINDING STATOR COILS OF MOTOR

CROSS-REFERENCE(S) TO RELATED APPLICATIONS

This application claims priority to Korean Patent Application No. 10-2012-0050649, filed on May 14, 2012, which is incorporated herein by reference in its entirety.

BACKGROUND

1. Field

The present disclosure relates to an electric rotary motor; and, particularly, to a method for binding stator winding coils.

2. Discussion of the Related Technology

In general, a motor necessarily includes a stator having coils wound therein, and the coils are inserted into slots of the stator.

Recently, a demand for miniaturization and high efficiency of a motor has continuously increased.

In order to realize the miniaturization and high efficiency of a motor according to such a demand, the slots of the stator include as many ring-shaped coils inserted therein as possible.

However, because of a dead space formed between a ring-shaped coil and another adjacent ring-shaped coil and another dead space formed between the ring-shaped coil and a stator's teeth, the quantity of the inserted ring-shaped coils is inevitably limited.

Examples of a winding method capable of accomplishing miniaturization and high efficiency of a motor by solving the above-described dead space problem may include a hairpin winding method.

In the hairpin winding method, coils may be wound in slots of a stator without a dead space formed therein. Therefore, the hairpin winding method has an advantage in terms of miniaturization and efficiency.

On the other hand, the hairpin winding method requires high-level manufacturing techniques such as coil forming, coil twisting, and coil welding, and a lot of problems occur during welding.

In particular, when a welding defect occurs while a welding operation is performed or after a welding operation is completed, welded coils are removed, and the stator manufacturing process are performed again. In this case, the damage caused by the welding defect is inevitably high.

Therefore, when the coil forming operation and the coil twisting operation of the hairpin winding method are more simplified, in particular, when the difficulties caused by the welding operation are removed, the advantage of the hairpin winding method in terms of miniaturization and efficiency may be maximized, and the merchantability of motors manufactured by the hairpin winding method may be improved.

In the hairpin winding method, however, a welding operation is performed after the hairpin coils are wound.

Because of the difficulties during the welding operation, coatings of the coils may be burned even though the coils are welded. Furthermore, since four layers are wounded adjacent to each other, coatings of first and second layers may be burned when third and fourth layers are welded, or coatings of the third and fourth layers may be burned when the first and second layers are welded. Furthermore, as primary-side copper loss increases due to an increase of contact resistance during partial welding, the efficiency may decrease at low speed.

The disadvantages of the manufacturing process may include an additional coil process for welding, the use of expensive equipment for correctly performing a welding process and cooling down welding heat, and welding gas which may pollute a work place.

In particular, attention is paid from the start to the end of the welding operation such that a welding defect does not occur. However, as the number of welding operations increases according to the number of stator slots, there is an inevitable limitation.

For example, when the number of stator slots is 72, welding operations are performed 144 times. Therefore, when a welding defect occurs at the 144th welding operation even though the first to 143rd operations are normally performed, all of the welded hairpin coils are removed, and the same process is repeated.

Therefore, the above-described patent document can hardly be free from various problems caused by welding, when manufacturing a motor according to the hairpin winding method which has an advantage in efficiency and output density because of the maximized space factor.

SUMMARY

An embodiment of the present invention is directed to a method for binding a stator winding coil, which may bind hairpin coils wound in a stator through an operation of fitting a conductor to the hairpin coils such that problems caused by a welding defect during a welding operation do not occur, and may remove disadvantages in a manufacturing process caused by expensive welding equipment, and a rotary motor to which the method is applied.

Other features and advantages of the present invention can be understood by the following description, and become apparent with reference to the embodiments of the present invention. Also, it is obvious to those skilled in the art to which the present invention pertains that the features and advantages of the present invention can be realized by the means as claimed and combinations thereof.

One aspect of the invention provides a method of making an electric motor, comprising: installing a plurality of hairpin coils in a plurality of slots, wherein the plurality of hairpin coils comprise a first hairpin coil and a second hairpin coil, the first hairpin coil comprising a first end and the second hairpin coil comprising a second end; inserting the first and second ends into a void of an electrically conductive coupler to electrically connect the first and second ends; and placing the insulation cap over the coupler so as to protect the coupler from contacting other electric conductive materials.

In the foregoing method, the coupler may surround the first and second ends. The first hairpin coil may comprise another end configured to be connected to a terminal of an electric source. The plurality of hairpin coils may comprise a third hairpin coil and a fourth hairpin coil, the third hairpin coil comprising a third end and the fourth hairpin coil comprising a fourth end; wherein the method may further comprise inserting the third and fourth ends into a void of an additional electrically conductive coupler to electrically connect the third and fourth ends; and wherein the insulation cap may be further placed over the additional coupler so as to protect the additional conductor from contacting the other electric conductive materials. The coupler and the additional coupler may be insulated from each other by the cap.

In accordance with an embodiment of the present invention, a method for binding a stator winding coil includes: inserting four hairpin coils, of which each two hairpin coils form a pair, into each of a plurality of slots formed radially in a stator, wherein portions of the hairpin coils inserted into the stator are exposed from one side of the stator and ready to be connected to a terminal for supplying electricity and the other portions of the hairpin coils are exposed from the other side of the stator and ready to be electrically connected; and connecting the other portions of the hairpin coils through a conductor, and fitting a cap to insulate the conductor after the conductor is connected.

Each of the hairpin coils may be manufactured using a raw coil coated with a coating and having a predetermined diameter and length, and may have a connection portion and portions which are not connected to each other but extended from the connection portion so as to face each other.

When two hairpin coils forming a pair among the four hairpin coils are inserted into one slot, the other two hairpin coils forming a pair may be inserted adjacent to the two hairpin coils.

The hairpin coils may be twisted in such a manner that the portions thereof are exposed from the one side of the stator and ready to be connected to the terminal for supplying electricity and the other portions thereof are exposed from the other side of the stator and ready to be electrically connected.

The portions of the hairpin coils may correspond to the connection portions of the hairpin coils inserted into the one slot, the other portions of the hairpin coils may correspond to the portions extended from the connection portions of the hairpin coils inserted into the one slot and facing each other, and the other portions of the twisted hairpin coils may correspond to adjacent portions of two hairpin coils inserted into the one slot.

The connection portions of the hairpin coils may be cut off before the hairpin coils are twisted, and coatings of the portions extended from the connection portion and facing each other may be removed to form ends.

The conductor may connect the two hairpin coils inserted into the one slot such that the hairpin coils electrically conduct.

The conductor may have an opening through which the two adjacent hairpin coils are fitted.

The cap may have an opening through which the conductor is fitted.

The cap may be fitted to insulate the conductor for electrically connecting the two adjacent hairpin coils and another conductor for electrically connecting other two adjacent hairpin coils at the same time.

In accordance with another embodiment of the present invention, a rotary motor to which a method for binding a stator winding coil is applied includes: a plurality of stators each having a plurality of slots which are formed in a radial manner and into which four hairpin coils each two forming a pair are inserted; a conductor coupled to the hairpin coils exposed from onside of the stator so as to electrically connect the hairpin coils, in a state where the hairpin coils are inserted to the stator; a cap formed of an insulator and fitted to the conductor to insulate the conductor.

The conductor may connect two adjacent hairpin coils inserted into one slot, and the cap may be fitted to insulate the conductor for electrically connecting the two adjacent hairpin coils and another conductor for electrically connecting two other adjacent hairpin coils at the same time.

The conductor may have an opening through which the two adjacent hairpin coils are fitted, and the cap may have an opening through which the conductor is fitted.

BRIEF DESCRIPTION OF THE DRAWINGS

FIGS. 2 to 5 are diagrams illustrating a state in which the rotary motor is manufactured according to the manufacturing process of FIG. 1.

DESCRIPTION OF EMBODIMENTS

Figure 1:
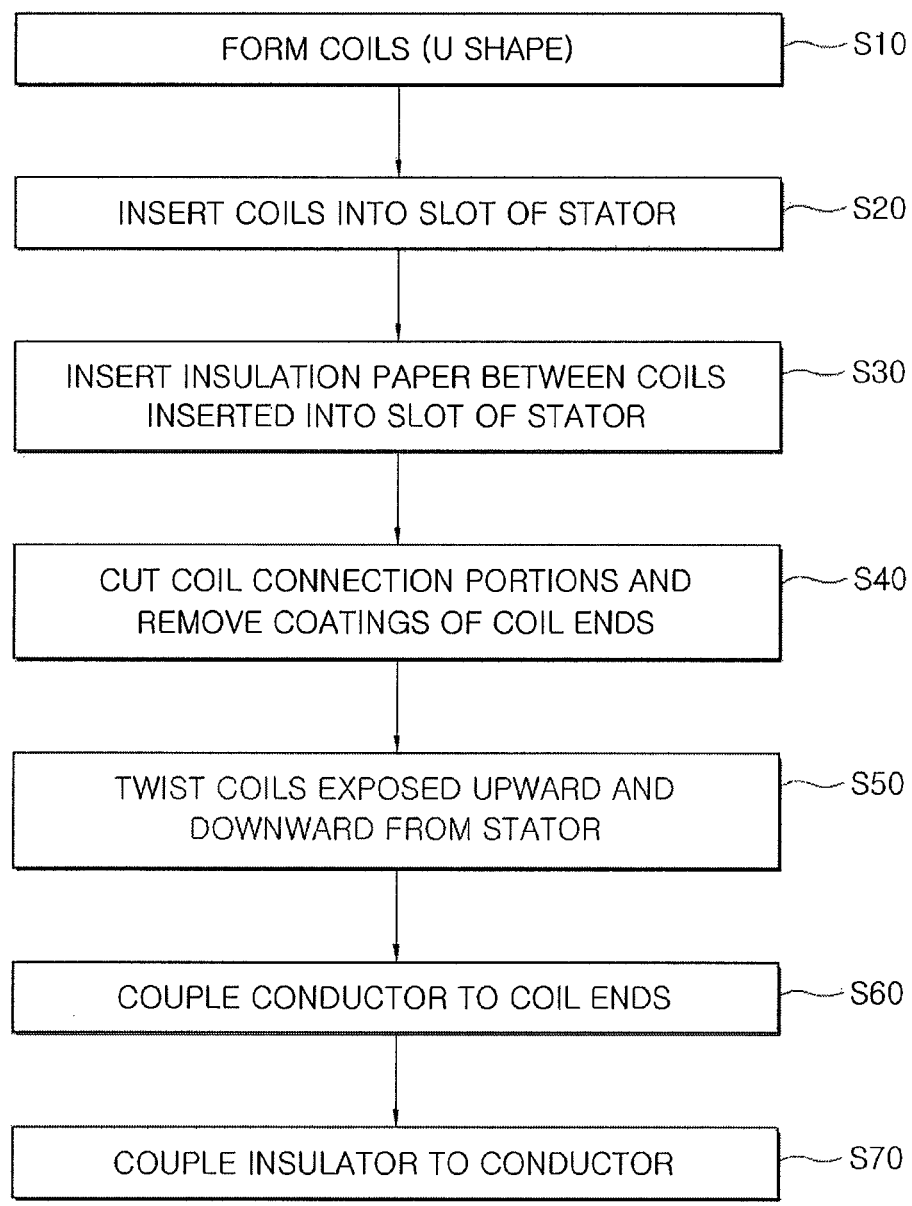
FIG. 1 shows a process for manufacturing a rotary motor, in which ends of coils wound in a stator are bound according to a non-welding method.

Embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 shows a process for manufacturing a rotary, electric motor, in which ends of coils wound in a stator are bound according to a non-welding method.

When the method for binding a stator winding coil is applied, rectangular copper wires come out of first and second layers of a hairpin coil and third and fifth layers of another hairpin coil adjacent to the hairpin coil, respectively, and a ring-shaped conductor coupler connects two rectangular copper wires among the rectangular copper wires without welding the respective copper wires, and is covered by a cap formed of an insulator. Accordingly, the method may satisfy effects of welding and insulating at the same time.

The method will be described in detail through steps S10 to S70.

Figure 2:
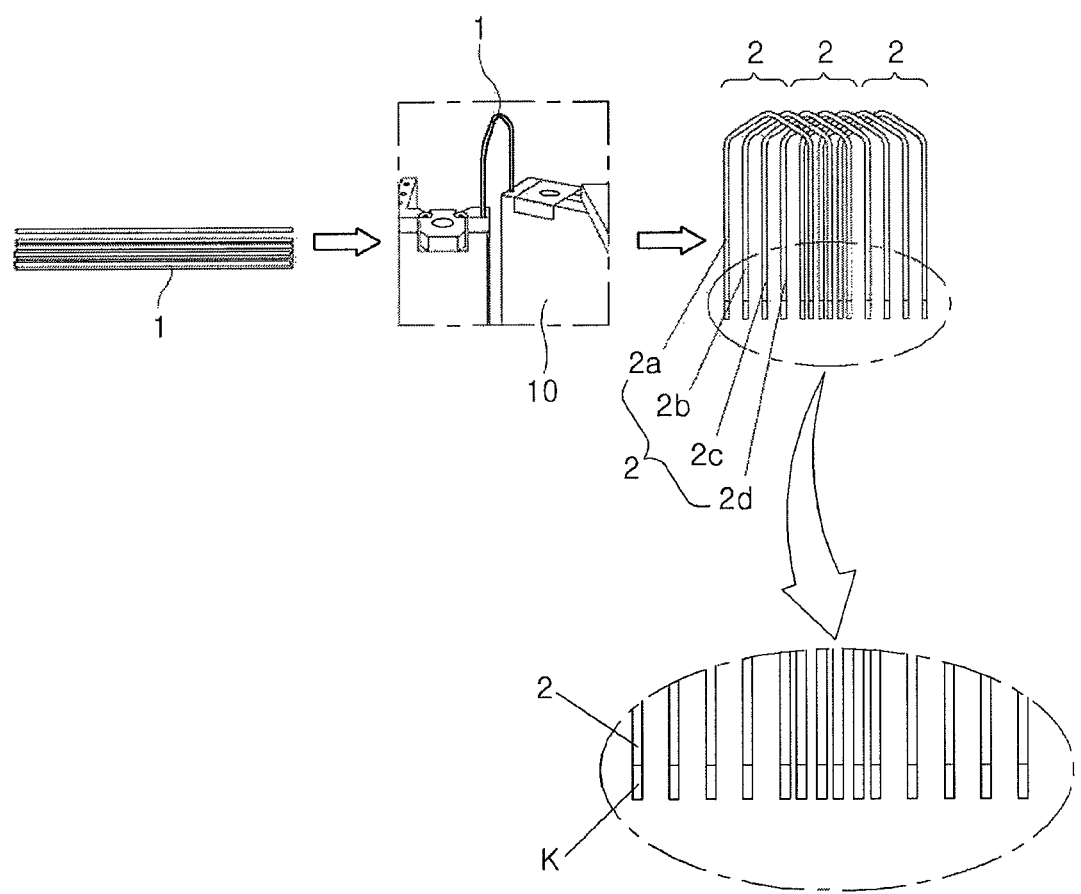

Step S10 is to process a coil formed of a conductor into a U-shaped hairpin coil. FIG. 2 illustrates the process of step S10.

Referring to FIG. 2, in embodiments, a raw coil 1 coated with a coating and having a predetermined diameter and length is prepared, and then processed into a hairpin coil 2 by a coil processor 10. The hairpin coil 2 has a connection portion and portions extended from the connection portion, and the extended portions are set to face each other, thereby forming a U-shape.

Four hairpin coils 2 are inserted into one slot of the stator, and are referred to as coil elements 2a, 2b, 2c, and 2d, respectively.

Therefore, the number of hairpin coils 2 to be manufactured is set four times larger than the number of slots of the stator.

Step S20 is to insert a hairpin coil 2 having four coil elements 2a to 2d into each slot 20a of the stator.

During this process, an insulation paper is inserted between the hair pin coils 2.

The plurality of slots are formed radially in the stator, and the stator is typically manufactured by stacking stator cores.

Accordingly, the first and second coil elements 2a and 2b and the third and fourth coil elements 2c and 2d are aligned in a state where they are sequentially arranged in a circumferential direction of the slot 20a. Through this process, the hairpin coil 2 having four coil elements 2a to 2d is inserted in each of the slots 20a formed in the stator 20.

Step S40 is to cut the connection portions of the coil elements 2a to 2d and remove the coatings such that ends K are formed at the cut portions, after the hairpin coils 2 are inserted into all of the slots 20a of the stator 20.

Typically, the formation of the ends K is performed after the hairpin coils 2 are inserted into all of the slots of the stator 20, but may be performed while the raw coil 1 is processed into the hairpin coil 2.

In this state, the ends K of the first and second coil elements 2a and 2b are not adjacent to each other, and the ends K of the third and fourth coil elements 2c and 2d are not adjacent to each other.

Step S50 is to twit upper and lower end portions of the hairpin coils 2 inserted into all of the slots 20a of the stator 20 such that the hairpin coils 2 are deformed.

The twisting operation is performed by a bender 30. Referring to FIG. 3 illustrating the twisting operation, the bender 30 sequentially twists the upper and lower end portions of the hairpin coils 2, exposed from the stator 20.

Accordingly, the respective ends K of the first and second coil elements 2a and 2b are adjacent to form a pair, and the respective ends K of the third and fourth coil elements 2c and 2d are adjacent to form a pair.

The hairpin coils 2 inserted into all of the slots 20a of the stator 20 are set in such a state.

Through the twisting operation, the hairpin coil 2 exposed upward from the stator 20 is ready to be connected to a terminal (for example, U and U', V and V', W and W', X and X', and Z and Z' in the case of a three-phase motor), and the hairpin coil 2 exposed downward from the stator 20 is ready to be electrically conducted.

Step S60 is to connect the hairpin coils 2 inserted into all of the slots 20a of the stator 20 such that the hairpin coils 2 are electrically conducted. This process does not require a welding operation, because conductors or electrically conductive couplers 40 are used.

Typically, each of the conductors 40 includes a first conductor element 40a to connect the first and second coil elements 2a and 2b and a second conductor element 40b to connect the third and fourth coil elements 2c and 2d.

Therefore, the number of conductors 40 to be manufactured is set to a half of the number of hairpin coils 2.

The conductor 40 has a rectangular shape of which one side is opened, and is fitted through the opening.

Figure 4:
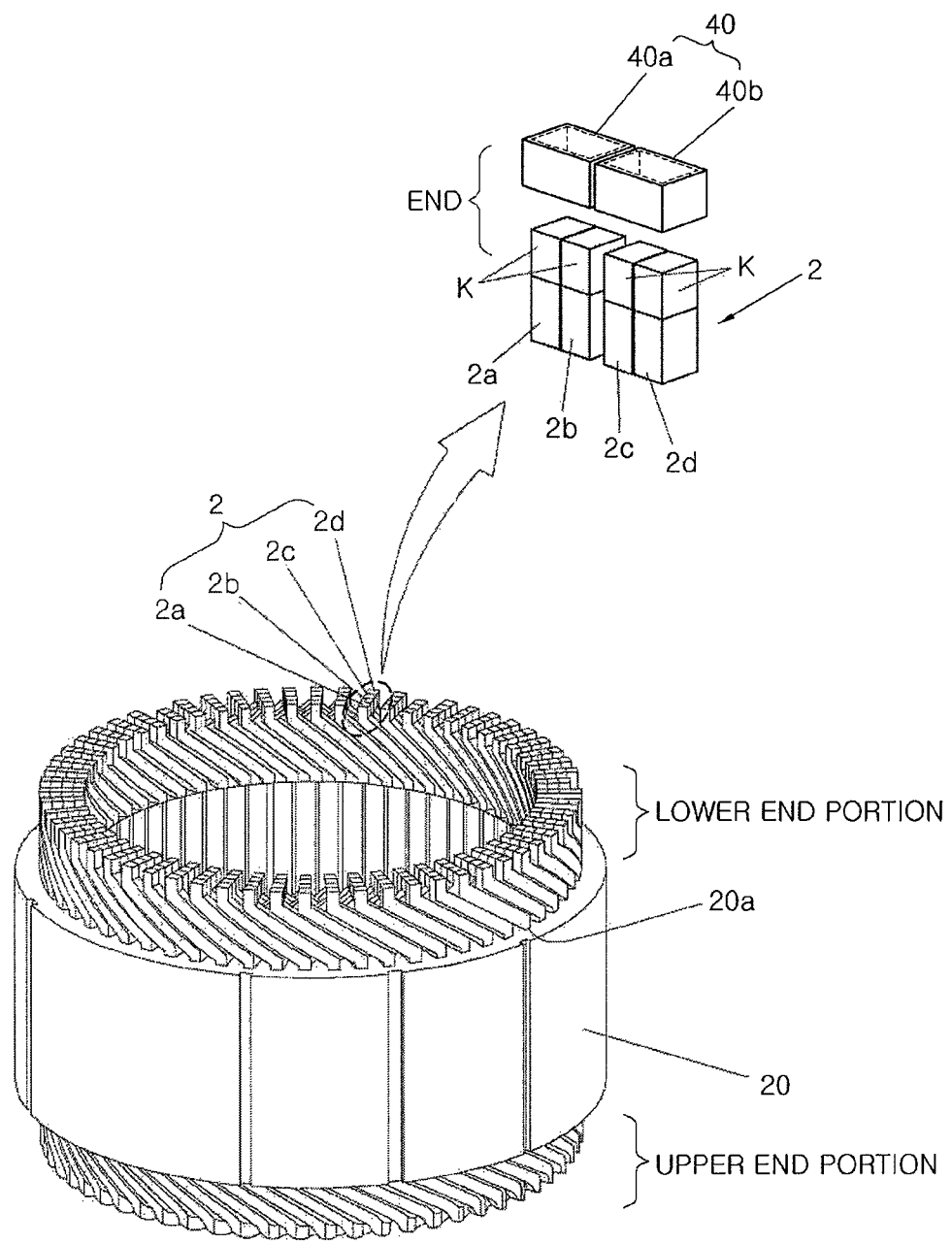

Referring to FIG. 4, step S60 may be completed by a simple operation of fitting the first conductor element 40a to the ends K of the first and second coil elements 2a and 2b and fitting the second conductor element 40b to the ends K of the third and fourth coil elements 2c and 2d.

The above-described operation of fitting the conductor 40 to the ends K is performed on the hairpin coils 20a inserted into all of the slots 20a of the stator 20, and all of the hairpin coils 2 are switched to a state in which they are electrically connected through the conductors 40.

Accordingly, the hairpin coils 2 may be manufactured without a welding operation which causes burning damage due to a welding defect and makes the manufacturing process difficult. In particular, it is possible to overcome the difficulties in acquiring the hairpin coil welding technique and the loss of cost competitiveness caused by expensive welding equipment.

Step S70 is to insulate the conductor 40 after the conductor 40 is coupled to the hairpin coil 2 inserted into each of the slots 20a of the stator 20.

This process is performed using a cap 50 formed of an insulator. Since the electrically insulating cap 50 covers the first and second conductor elements 40a and 40b together, the number of caps to be manufactured is set to a half of the number of conductors 40.

The cap 50 has a rectangular shape of which one side is opened, and is fitted through the opening.

Figure 5:
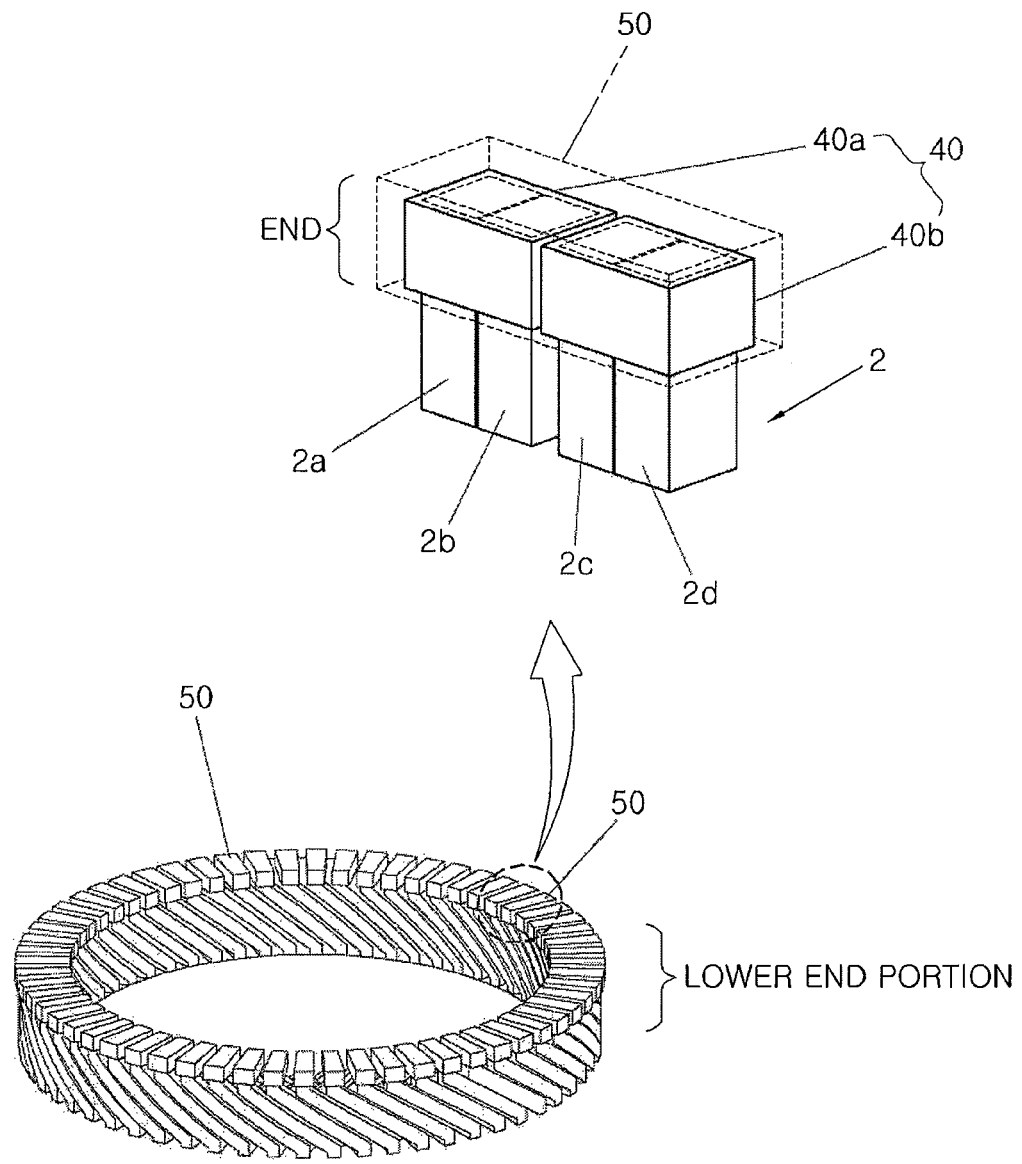

Referring to FIG. 5, the process may be completed by a simple operation of aligning the first conductor element 40a fitted to the adjacent ends K of the first and second coil elements 2a and 2b and the second conductor element 40b fitted to the adjacent ends K of the third and fourth coil elements 2c and 2d, and then fitting the cap 50 to the first and second conductor elements 40a and 40b.

As the above-described operation of fitting the cap 50 is performed on all of the hairpin coils 2 coupled to the first and second conductor elements 40a and 40b, the hairpin coils 2 are connected through the conductors 40. Then, the hairpin coils 2 not only are electrically connected, but also maintain the insulation state.

Therefore, the operation of electrically connecting the hairpin coils 2 and the operation of insulating the hairpin coils 2 may be performed in one place at the same time. Accordingly, it is possible to overcome the inconvenience and merchantability loss when the electrical connection operation is performed by welding. Specifically, the inconvenience and merchantability loss may occur because the electrical connection operation and the insulation operation are not performed at the same time and are performed in different places.

Figure 6:
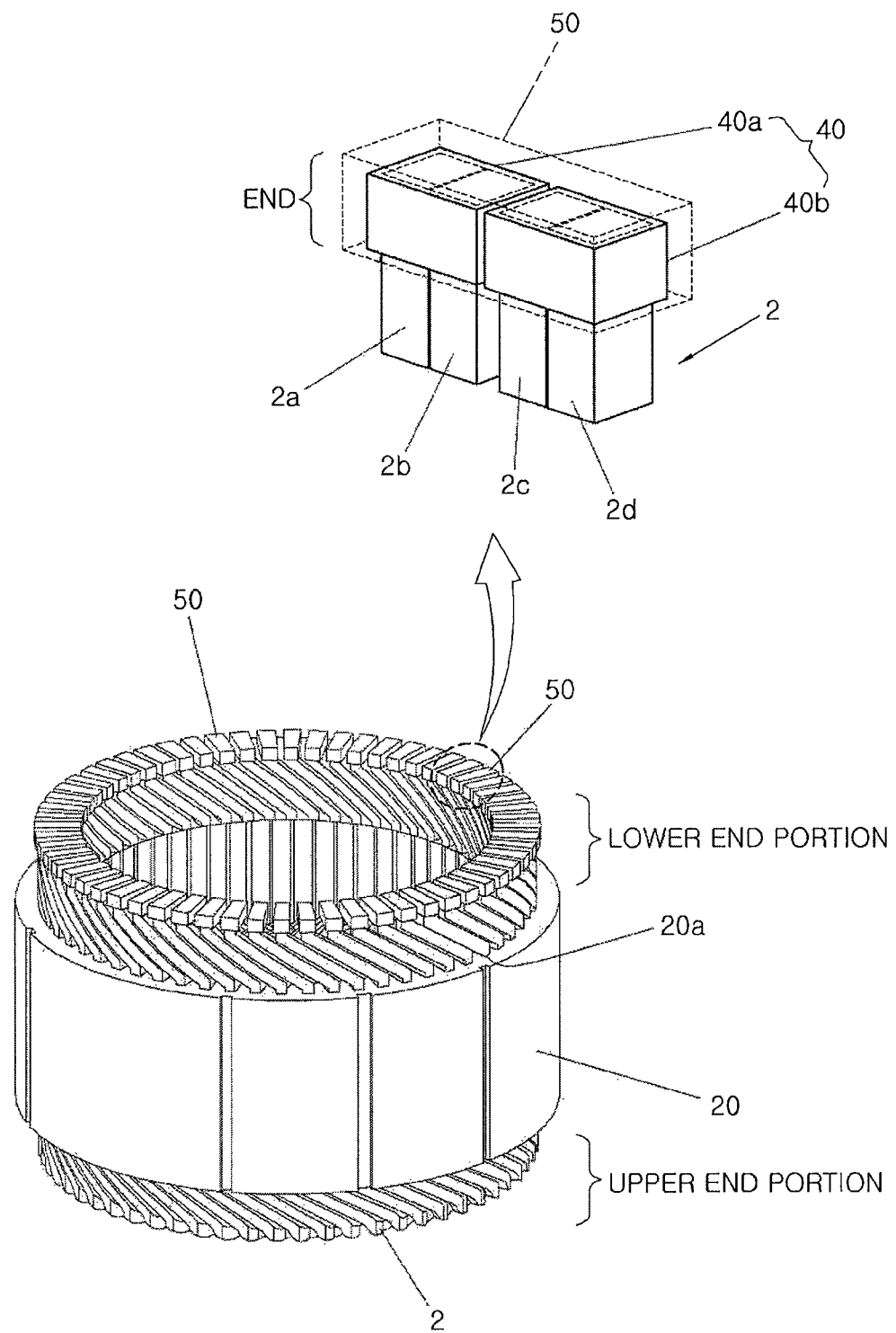
FIG. 6 illustrates the rotary motor which is manufactured by applying a method for binding a stator winding coil in accordance with an embodiment of the present invention.

FIG. 6 illustrates the rotary motor manufactured by the method for binding a stator winding coil in accordance with the embodiment of the present invention.

In the above-described method for binding a stator winding coil in accordance with the embodiment of the present invention, four hairpin coils 2 of which each two hairpin coils form a pair are inserted into the stator 20 through each of the slots 20a formed in a radial shape, portions of the hairpin coils 2 inserted into the stator 20 are exposed from one side of the stator 20 and ready to be connected to a terminal for supplying electricity, the other portions of the hairpin coils 2 are exposed from the other side of the stator 20 and connected to the conductors 40 so as to electrically conduct, and the conductors 40 are insulated by the caps 50. Therefore, the electrical connection operation and the insulation operation may be performed in one place at the same time during the hairpin coil winding operation. Accordingly, the method does not require a welding operation which causes burning damage due to a welding defect and makes the manufacturing process difficult.

In accordance with the embodiment of the present invention, as a welding operation is removed during the process of manufacturing a rotary motor having hairpin coils wound therein, it is possible to exclude problems caused by a welding defect during a welding operation. Furthermore, the disadvantages of the manufacturing process caused by expensive welding equipment may be overcome. Accordingly, the cost and the working environment may be significantly improved.

Furthermore, the operation of binding the hairpin coils wound in the stator is performed by the fitting operation using the conductor. Therefore, it is possible to significantly simplify the complex process in which the number of welding operations increases according to the number of slots of the stator. Furthermore, as the hairpin coils are completely bound through the conductor after the binding operation, contact resistance and copper loss are reduced, which makes it possible to significantly improve the motor efficiency.

Furthermore, the conductor to connect the hairpin coils wound in the stator is insulated by an operation of fitting the cap to the conductor. Therefore, the insulation operation is easily performed. As the conductor is separately insulated by the cap, the insulation performance is improved, which makes it possible to significantly increase the lifetime of the motor.

While embodiments of the present invention have been described, it will be apparent to those skilled in the art that various changes and modifications may be made without departing from the spirit and scope of the invention as defined in the following claims.

What is claimed is:

1. A method of making a motor, comprising:
providing a stator block comprising a plurality of slots each configured for receiving at least one conductive wire;
inserting electrically conductive pins into the plurality of slots such that a tip portion of a first one of the electrically conductive pins and a tip portion of a second one of the electrically conductive pins are arranged next to each other;
mechanically coupling the tip portions of the first and second electrically conductive pins with a first conductive coupling ring without welding; and
subsequently, placing an electrically insulating cap over the first conductive coupling ring.

2. The method of claim 1, wherein each of the electrically conductive pins comprising an electrically insulating jacket over its extension excluding a tip portion thereof.

3. The method of claim 1, wherein a tip portion of a third one of the electrically conductive pins and a tip portion of a fourth one of the electrically conductive pins are arranged next to each other, wherein the tip portions of the third and fourth electrically conductive pins are electrically and mechanically coupled with a second conductive coupling ring, wherein the first and second electrically conductive pins are inserted into one of the plurality of slots.

4. The method of claim 1, wherein the tip portion of the first electrically conductive pin is referred to as a first tip portion, wherein the first electrically conductive pin further comprises a second tip portion and a bent portion interposed between the first and second tip portions, wherein the second tip portion of the first electrically conductive pin is electrically and mechanically coupled with a tip portion of a third one of the electrically coupled pins by another conductive coupling ring, wherein the bent portion of the first electrically conductive pin is exposed outside the stator block.

5. The method of claim 4, wherein the first tip portion of the first electrically conductive pin extends out of a first one of the plurality of slots and the second tip portion of the first electrically conductive pin extends out of a second one of the plurality of slots such that the bent portion is linking the first and second slots.

6. The method of claim 4, wherein the first and second electrically conductive pins are twisted.

7. The method of claim 1, wherein the conductive coupling ring has an opening, and the tip portions of the first and second electrically conductive pins fitted into the opening.

8. The method of claim 7, wherein the opening is generally in a rectangular shape.

9. The method of claim 1, wherein a tip portion of a third one of the electrically conductive pins and a tip portion of a fourth one of the electrically conductive pins are arranged next to each other, wherein the tip portions of the third and fourth electrically conductive pins are electrically and mechanically coupled with a second conductive coupling ring, wherein the electrically insulating cap covers both the first and second conductive coupling rings such that the tips of the first, second, third and fourth electrically conductive pins are bundled together.

10. The method of claim 9, wherein the tip portions of the first and second electrically conductive pins are fitted into the first conductive coupling ring, wherein the tip portions of the third and fourth electrically conductive pins are fitted into the second conductive coupling ring.

* * * * *